(12) United States Patent
Kirilin et al.

(10) Patent No.: US 12,454,496 B2
(45) Date of Patent: Oct. 28, 2025

(54) PROCESSES FOR PREPARING C2 TO C3 HYDROCARBONS IN THE PRESENCE OF A HYBRID CATALYST

(71) Applicant: Dow Global Technologies LLC, Midland, MI (US)

(72) Inventors: Alexey Kirilin, Terneuzen (NL); Dean M. Millar, Midland, MI (US); Adam Chojecki, Ghent (BE); Joseph F. DeWilde, King of Prussia, PA (US); Glenn Pollefeyt, Wondelgem (BE); Davy L. S. Nieskens, Terneuzen (NL); Andrzej Malek, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 428 days.

(21) Appl. No.: 18/003,800

(22) PCT Filed: Jun. 18, 2021

(86) PCT No.: PCT/US2021/038030
§ 371 (c)(1),
(2) Date: Dec. 29, 2022

(87) PCT Pub. No.: WO2022/005770
PCT Pub. Date: Jan. 6, 2022

(65) Prior Publication Data
US 2023/0234899 A1 Jul. 27, 2023

Related U.S. Application Data

(60) Provisional application No. 63/045,893, filed on Jun. 30, 2020.

(51) Int. Cl.
*C07C 1/12* (2006.01)
*B01J 21/06* (2006.01)
(Continued)

(52) U.S. Cl.
CPC ............... *C07C 1/12* (2013.01); *B01J 21/066* (2013.01); *B01J 23/002* (2013.01); *B01J 23/08* (2013.01);
(Continued)

(58) Field of Classification Search
CPC ... C07C 1/12; C07C 2523/08; C07C 2521/06; C07C 2529/50; C07C 9/08; C07C 11/04;
(Continued)

(56) References Cited

U.S. PATENT DOCUMENTS 4,440,871 A 4/1984 Lok et al.
4,449,961 A 5/1984 Forbus
(Continued)

FOREIGN PATENT DOCUMENTS

WO 1986004577 A1 8/1986
WO 2016044010 A1 3/2016
(Continued)

OTHER PUBLICATIONS

International Search Report and Written Opinion issued by the European Patent Office acting as International Searching Authority for International Patent Application No. PCT/US2021/038030 dated Sep. 29, 2021 (12 total pages).
(Continued)

*Primary Examiner* — Jafar F Parsa
(74) *Attorney, Agent, or Firm* — Dinsmore & Shohol LLP

(57) ABSTRACT

A process for preparing C2 to C3 hydrocarbons may include introducing a feed stream including hydrogen gas and a carbon-containing gas comprising carbon monoxide, carbon dioxide, and mixtures thereof into a reaction zone of a reactor, and converting the feed stream into a product stream comprising C2 to C3 hydrocarbons in the reaction zone in the presence of a hybrid catalyst. The hybrid catalyst may include a metal oxide catalyst component and a microporous
(Continued)

catalyst component comprising 8-MR pore openings less than or equal to 5.1 A and a cage defining ring size less than or equal to 7.45 A, where a C2/C3 carbon molar ratio of the product stream is greater than or equal to 0.7.

15 Claims, 1 Drawing Sheet

(51) Int. Cl.

| | | |
|---|---|---|
| *B01J 23/00* | (2006.01) | |
| *B01J 23/08* | (2006.01) | |
| *B01J 29/50* | (2006.01) | |
| *B01J 29/60* | (2006.01) | |
| *B01J 35/64* | (2024.01) | |

(52) U.S. Cl.
CPC .............. *B01J 29/50* (2013.01); *B01J 29/60* (2013.01); *B01J 35/643* (2024.01); *C07C 2521/06* (2013.01); *C07C 2523/08* (2013.01); *C07C 2529/50* (2013.01); *C07C 2529/60* (2013.01)

(58) Field of Classification Search
CPC ........ B01J 21/066; B01J 23/002; B01J 23/08; B01J 29/50; B01J 35/643; B01J 29/60
See application file for complete search history.

(56) References Cited

U.S. PATENT DOCUMENTS

| | | |
|---|---|---|
| 4,481,376 A | 11/1984 | Wunder |
| 4,503,023 A | 3/1985 | Breck et al. |
| 2014/0000157 A1 | 1/2014 | O'Connor |
| 2019/0336954 A1 | 11/2019 | Wu et al. |
| 2020/0123078 A1 | 4/2020 | Nieskens et al. |

FOREIGN PATENT DOCUMENTS

| | | |
|---|---|---|
| WO | 2017074558 A1 | 5/2017 |
| WO | 2020005701 A1 | 1/2020 |
| WO | 2020005703 A1 | 1/2020 |
| WO | 2020150067 A1 | 7/2020 |

OTHER PUBLICATIONS

F. Jiao, et al., "Selective conversion of syngas to light olefins", Science, vol. 351, Issue 6277, pp. 1065-1068 (2016).
J. Su, et al., "Syngas to light olefins conversion with high olefin/paraffin ratio using ZnCrOx/AlPO-18 bifunctional catalysts", Nature Communications, vol. 10, Issue 1297, pp. 1-8 (2019).
S. Wilson and P. Barger, "The characteristics of SAPO-34 which influence the conversion of methanol to light olefins", Microporous and Mesoporous Materials, vol. 29, pp. 117-126 (1999).
Kang, Jong Hun et al., "Cage-defining Ring: A Molecular Sieve Structural Indicator for Light Olefin Product Distribution from the Methanol-to-Olefins Reaction", ACS Catalysis, vol. 9, pp. 1-12 (Apr. 11, 2019).
G. Li, et al., "Selective conversion of syngas to propane over ZnCrOx-SSZ-39 OX-ZEO catalysts", Journal of Energy Chemistry, 2019, vol. 36, pp. 141-147.
International Search Report and Written Opinion dated Oct. 12, 2021, pertaining to Int'l Patent Application No. PCT/US2021/038023, 11 pgs.
US Final Rejection dated Oct. 18, 2024, pertaining to U.S. Appl. No. 18/003,843, 14 pgs.
US Non-Final Office Action dated Apr. 1, 2025, pertaining to U.S. Appl. No. 18/003,843, 15 pgs.
Eborn et al. "Effect of Iron Acquisition on Induction of DNA Single Strand-Breaks by Erionite a Carcinogen Mineral Fiber" Archives of Biochemistry and Biophysics, vol. 316, Issue 1, Jan. 1995, pp. 507-514.
Search results for "natural natrolite" "iron contamination" retrieved Mar. 20, 2025, 61 pgs.
US Office Action dated Mar. 29, 2024, pertaining to U.S. Appl. No. 18/003,843, 14 pgs.
Mindat.org "Erionite" pp. 1-10. 2016 (Year: 2016).
Mindat.org "Natrolite" pp. 2-4, 2016 (Year: 2016).
Kuwait Examination Report dated Nov. 14, 2024, pertaining to KW Patent Application No. KW/P/2022/001621, 4 pgs.
Brazilian Technical Report dated Jun. 25, 2025, pertaining to BR Patent Application No. BR112022024723.0, 8 pgs.

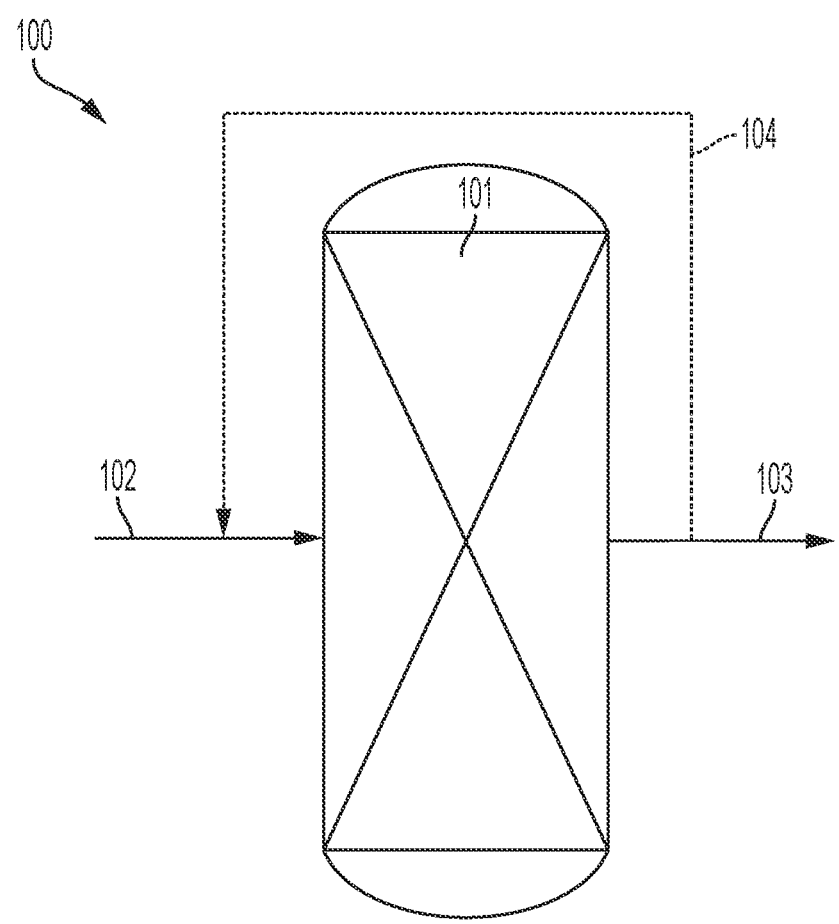

PROCESSES FOR PREPARING C2 TO C3 HYDROCARBONS IN THE PRESENCE OF A HYBRID CATALYST

CROSS-REFERENCE TO RELATED APPLICATIONS

This application is a National Phase Entry under 35 U.S.C. § 371 of International Patent Application No. PCT/US2021/038030, filed Jun. 18, 2021, which claims priority to U.S. Provisional Patent Application No. 63/045,893 filed on Jun. 30, 2020, the entire disclosures of which are hereby incorporated by reference in their entireties.

BACKGROUND

Field

The present specification generally relates to processes that convert a hydrogen and carbon-containing feed stream to $C_2$ to $C_3$ hydrocarbons. In particular, the present specification relates to processes for converting a hydrogen and carbon-containing feed stream to $C_2$ to $C_3$ hydrocarbons using a hybrid catalyst comprising a metal oxide catalyst component and a microporous catalyst component.

Generally, in hybrid catalyst processes, the hydrogen and carbon-containing feed stream, such as synthesis gas (syngas), comprises hydrogen ($H_2$) gas and a carbon-containing gas. Hybrid catalysts used in the hybrid catalyst processes generally comprise a combination of a mixed metal oxide catalyst component and a microporous catalyst component, such as a molecular sieve, that operate in tandem.

Technical Background

For a number of industrial applications, hydrocarbons are used, or are starting materials used, to produce plastics, fuels, and various downstream chemicals. $C_2$ to $C_3$ hydrocarbons are particularly useful in downstream applications. A variety of processes for producing these lower hydrocarbons have been developed, including petroleum cracking and various synthetic processes.

Synthetic processes for converting feed carbon to desired products, such as lower hydrocarbons, are known. However, current hybrid catalyst processes may result in a lower $C_2/C_3$ carbon molar ratio in the product than is desired.

Accordingly, a need exists for processes and systems, and the hybrid catalysts used therein, in which the $C_2/C_3$ carbon molar ratio in the product stream is higher, while still having a sufficiently high productivity of the desired $C_2$ to $C_3$ hydrocarbons.

SUMMARY

Embodiments of the present disclosure meet this and other needs by converting a hydrogen and carbon-containing feed stream to $C_2$ to $C_3$ hydrocarbons using a hybrid catalyst comprising a metal oxide catalyst component and a microporous catalyst component comprising 8-MR pore openings having sizes less than or equal to 5.1 Å and a cage defining ring size less than or equal to 7.45 Å, where a carbon molar ratio of $C_2/C_3$ in the product stream is greater than or equal to 0.7.

According to embodiments, processes for preparing $C_2$ to $C_3$ hydrocarbons comprise introducing a feed stream comprising hydrogen gas and a carbon-containing gas comprising carbon monoxide, carbon dioxide, and mixtures thereof into a reaction zone of a reactor, and converting the feed stream into a product stream comprising $C_2$ to $C_3$ hydrocarbons in the reaction zone in the presence of a hybrid catalyst, the hybrid catalyst comprising a metal oxide catalyst component and a microporous catalyst component comprising 8-membered ring (MR) pore openings having a size of less than or equal to 5.1 Å and a cage defining ring size less than or equal to 7.45 Å, wherein a $C_2/C_3$ carbon molar ratio of the product stream is greater than or equal to 0.7.

Additional features and advantages will be set forth in the detailed description which follows, and in part will be readily apparent to those skilled in the art from that description or recognized by practicing the embodiments described herein, including the detailed description which follows and the claims.

It is to be understood that both the foregoing general description and the following detailed description describe various embodiments and are intended to provide an overview or framework for understanding the nature and character of the claimed subject matter.

BRIEF DESCRIPTION OF THE DRAWINGS

FIG. 1 is a schematic view illustrating a stream being introduced to a reactor and a resulting product stream exiting the reactor in accordance with one or more embodiments of the present disclosure.

DETAILED DESCRIPTION

Reference will now be made in detail to embodiments of processes for converting a feed stream comprising hydrogen and a carbon containing gas comprising carbon monoxide, carbon dioxide, and mixtures thereof to $C_2$ to $C_3$ hydrocarbons with a $C_2/C_3$ carbon molar ratio of the product stream that is greater than or equal to 0.7. The processes use a hybrid catalyst comprising a metal oxide catalyst component and a microporous catalyst component comprising 8-MR pore openings having a size less than or equal to 5.1 Å and a cage defining ring size less than or equal to 7.45 Å. As used herein, $C_2/C_3$ carbon molar ratio is defined as the ratio of the moles of carbon present in ethylene and ethane streams (in moles per hour) relative to the moles of carbon present in propylene and propane streams (in moles per hour).

As used herein, it is noted that "synthesis gas" and "syngas" are utilized herein to represent a mixture comprising primarily hydrogen, carbon monoxide, carbon dioxide and very often some inerts.

Cage defining ring size, which is a well-known feature to those skilled in the art, is further described in "Cage-Defining Ring: A Molecular Sieve Structural Indicator for Light Olefin Product Distribution from the Methanol-to-Olefins Reaction," John Hun Kang, Faisal H. Alshafei, Stacey I. Zones, & Mark E. Davis, ACS Catalysis 2019 9(7), 6012-6019 (Apr. 11, 2019). For those topologies that do not form cages, the cage-defining ring size may apply to the structure. For example, a topology with an ellipsoid-shape, the cage-defining ring size equivalent may be the largest radius of the ellipsoid-shape.

The use of microporous catalyst components when converting feed streams comprising carbon to desired products, such as, for example, $C_2$ to $C_3$ hydrocarbons, is known. In general, in syngas to hydrocarbon processes, it is desirable to achieve a high productivity of the desired $C_2$ to $C_3$ hydrocarbons, while simultaneously achieving a high catalyst activity. However, microporous catalyst components traditionally used in syngas to hydrocarbon processes may result in a product with an undesirably low $C_2/C_3$ carbon molar ratio. Specifically, in some syngas to hydrocarbon processes, the intention may be to maximize the amount of $C_2$ hydrocarbons formed. As disclosed and described herein, it has been discovered that a microporous catalyst component comprising 8-MR pore openings having sizes less than or equal to 5.1 Å and a cage defining ring size less than or equal to 7.45 Å may increase the $C_2/C_3$ carbon molar ratio of the product and the amount of $C_2$ hydrocarbons formed. Syngas to hydrocarbon process with increased $C_2/C_3$ carbon molar ratio in the product according to embodiments will now be described in more detail.

Referring to the embodiment of FIG. 1, a feed stream 102 is fed into a reaction zone 101, the feed stream 102 may comprise $H_2$, carbon monoxide (CO), carbon dioxide ($CO_2$), and mixtures thereof. In one or more embodiments, the feed stream 102 is syngas. In embodiments, the $H_2$ gas is present in the feed stream 102 in an amount of from 10 volume percent (vol. %) to 90 vol. %, based on a combined volume of the $H_2$, CO, and $CO_2$. In embodiments, the $H_2$ gas is present in the feed stream 102 in an amount from 40 vol. % to 80 vol. % or from 60 vol. % to 80 vol. %, based on combined volume of $H_2$, CO, and $CO_2$. The feed stream 102 is introduced into the reaction zone 101 and contacted with a hybrid catalyst in the reaction zone 101. As will be described in more detail herein, the hybrid catalyst comprises a mixed metal oxide catalyst component and a microporous catalyst component. After the feed stream 102 is introduced to the reaction zone 101 and contacted with the hybrid catalyst, a product stream 103 is passed out of the reaction zone 101. The product stream 103 may be separated to form a recycle stream 104 that is, according to embodiments, combined with the feed stream 102 or, according to embodiments, may be introduced to the reaction zone 101 (not shown in FIG. 1) to be combined with the feed stream 102.

As disclosed herein above, the feed stream 102 may comprise $H_2$, CO, $CO_2$, or combinations thereof. The feed stream 102 may, according to embodiments, comprise greater than 10.0 vol. % $H_2$, such as from 10.0 vol. % to 90.0 vol. % $H_2$, from 10.0 vol. % to 80.0 vol. % $H_2$, from 10.0 vol. % to 70.0 vol. % $H_2$, from 10.0 vol. % to 60.0 vol. % $H_2$, from 10.0 vol. % to 50.0 vol. % $H_2$, from 10.0 vol. % to 40.0 vol. % $H_2$, or from 10.0 vol. % to 30.0 vol. % $H_2$. In embodiments, the feed stream 102 comprises from 20.0 vol. % to 90.0 vol. % $H_2$, such as from 30.0 vol. % to 90.0 vol. % $H_2$, from 40.0 vol. % to 90.0 vol. % $H_2$, from 50.0 vol. % to 90.0 vol. % $H_2$, or from 80.0 vol. % to 90.0 vol. % $H_2$. In one or more embodiments, the feed stream 102 comprises from 20.0 vol. % to 80.0 vol. % $H_2$, such as from 40.0 vol. % to 80.0 vol. % $H_2$, or from 60.0 vol. % to 80.0 vol. % $H_2$. In embodiments, the feed stream 102 comprises from 45.0 vol. % to 85.0 vol. % $H_2$, such as from 55.0 vol. % to 85.0 vol. % $H_2$ or from 65.0 vol. % to 85.0 vol. % $H_2$.

Without being bound to any particular theory, it is believed that the coking and decoking rates are nearly balanced, which may significantly reduce coking on the hybrid catalyst. This, in turn, may allow the hybrid catalyst to remain in the reaction zone 101 for extended periods of time without the need for regeneration. In embodiments, the hybrid catalyst may remain in the reaction zone 101 without coking for greater than 5 hours, such as greater than 7.5 hours, greater than 10 hours, greater than 12.5 hours, greater than 15 hours, greater than 17.5 hours, greater than 20 hours, greater than 22.5 hours, greater than 25 hours, greater than 27.5 hours, or greater than 30 hours.

In embodiments, the product stream 103 may comprise greater than 40 C mol % $C_2$ to $C_3$ hydrocarbons based on the total hydrocarbon fraction in the product stream 103, such as greater than 42 C mol %, greater than 44 C mol %, greater than 46 C mol %, greater than 48 C mol %, or greater than 50 C mol %. In one or more embodiments, the $C_2$ to $C_3$ hydrocarbons consist essentially of $C_2$ to $C_3$ olefins.

In embodiments, the $C_2/C_3$ carbon molar ratio of the product stream 103 may be greater than or equal to 1.0. For example, in embodiments, the $C_2/C_3$ carbon molar ratio of the product stream 103 may be greater than or equal to 1.1, greater than or equal to 1.2, greater than or equal to 1.3, greater than or equal to 1.4, or greater than or equal to 1.5. In embodiments, the $C_2/C_3$ carbon molar ratio of the product stream 103 may be less than or equal to 3.0, less than or equal to 2.9, less than or equal to 2.8, less than or equal to 2.7, less than or equal to 2.6, or less than or equal to 2.5. In embodiments, the $C_2/C_3$ carbon molar ratio of the product stream 103 may be greater than or equal to 1.0 and less than or equal to 3.0, such as greater than or equal to 1.0 and less than or equal to 2.8, greater than or equal to 1.0 and less than or equal to 2.6, greater than or equal to 1.2 and less than or equal to 3.0, greater than or equal to 1.2 and less than or equal to 2.8, greater than or equal to 1.2 and less than or equal to 2.6, greater than or equal to 1.5 and less than or equal to 3.0, greater than or equal to 1.5 and less than or equal to 2.8, or greater than or equal to 1.5 and less than or equal to 2.6.

The reaction conditions within the reaction zone 101 will now be described. The feed stream 102 may be contacted with the hybrid catalyst in the reaction zone 101 under reaction conditions sufficient to form the product stream 103 comprising $C_2$ to $C_3$ hydrocarbons. The reaction conditions comprise a temperature within the reaction zone 101 ranging, according to one or more embodiments, from 300° C. to 500° C., such as from 380° C. to 450° C., from 380° C. to 440° C., from 380° C. to 430° C., from 380° C. to 420° C., from 380° C. to 410° C., from 380° C. to 400° C., or from 380° C. to 390° C. In embodiments, the temperature within the reaction zone 101 is from 390° C. to 450° C., from 400° C. to 450° C., from 410° C. to 450° C., from 420° C. to 450° C., from 430° C. to 450° C., or from 440° C. to 450° C. In embodiments, the temperature within the reaction zone 101 is from 380° C. to 450° C., such as from 390° C. to 440° C., from 400° C. to 430° C., or from 410° C. to 420° C.

The reaction conditions also, in embodiments, include a pressure inside the reaction zone 101 of at least 20 bar (20,000 kilopascals (kPa)), such as at least 25 bar (25,000 kPa), at least 30 bar (30,000 kPa), at least 35 bar (35.00 kPa), at least 40 bar (40,000 kPa), at least 45 bar (45,000 kPa), at least 50 bar (50,000 kPa), at least 55 bar (55,000 kPa), at least 60 bar (60,000 kPa), at least 65 bar (65,000 kPa), or at least 70 bar (70,000 kPa). In embodiments, the reaction conditions include a pressure inside the reaction zone 101 from 20 bar (20,000 kPa) to 70 bar (70,000 kPa), such as from 25 bar (25,000 kPa) to 65 bar (65,000 kPa), or from 30 bar (30,000 kPa) to 60 bar (60,000 kPa), from 35 bar (35,000 kPa) to 55 bar (55,000 kPa), from 40 bar (40,000 kPa) to 50 bar (50,000 kPa).

The reaction conditions also, in embodiments, include a gas hourly space velocity (GHSV) (measured as the volume of the feed stream 102 per volume of the catalyst per hour) inside the reaction zone 101 of at least 500 $hr^{-1}$, such as at least 1000 $hr^{-1}$, such as at least 1200 hr 1, such as at least 1800 $hr^{-1}$, such as at least 2400 $hr^{-1}$, such as at least 3000 $hr^{-1}$, such as at least 3600 $hr^{-1}$, such as at least 4200 $hr^{-1}$, such as at least 4800 $hr^{-1}$, such as at least 5400 $hr^{-1}$, such as at least 6000 hr$^{-1}$, such as at least 6600 hr$^{-1}$, or such as at least 7200 hr$^{-1}$. In embodiments, the reaction conditions also include a GHSV inside the reaction zone 101 of less than 15000 hr$^{-1}$, such as less than 14600 hr$^{-1}$, such as less than 14000 hr$^{-1}$, such as less than 13400 hr$^{-1}$, or such as less than 12800 hr$^{-1}$.

The hybrid catalyst used in the above-disclosed processes will now be described. As previously described, the hybrid catalyst systems comprise a metal oxide catalyst component, which converts the feed stream to oxygenated hydrocarbons, and a microporous catalyst component, which converts the oxygenated hydrocarbons to hydrocarbons.

In one or more embodiments, the mixed metal oxide catalyst component may be a bulk catalyst or a supported catalyst and may be made by any suitable method, such as co-precipitation, impregnation, or the like. In embodiments, the mixed metal oxide catalyst component may comprise gallium, lanthanum, or combinations thereof. In embodiments, the mixed metal oxide catalyst component may comprise zirconia. In embodiments, the mixed metal oxide catalyst component may comprise gallium, lanthanum, or combinations thereof supported on zirconia. Additional mixed metal oxide catalyst components are contemplated depending on the product slate determined by the microporous catalyst component. Without being bound to any particular theory, the cage geometry in combinations with the pore access of the microporous catalyst component may be partially determinative of the $C_2/C_3$ carbon molar ratio based on the hydrocarbons produced in the product stream 103 regardless of the mixed metal oxide catalyst used. It should be understood that any metal in the mixed metal oxide component mixture can be present in a variety of oxidation states. It should also be understood that the designation of a specific oxide (e.g. $Ga_2O_3$), does not necessarily preclude the presence of an additional or different oxide of the given metal(s).

In embodiments, the mixed metal oxide catalyst component may be reduced within the reactor prior to exposure to the feed stream 102 by exposing the mixed metal oxide catalyst component to conventional reducing gases. In one or more embodiments, the mixed metal oxide catalyst component may be reduced within the reactor upon exposure to reducing gases in the feed stream 102 such as $H_2$ and CO.

The hybrid catalyst, according to embodiments, comprises a mixed metal oxide catalyst component in admixture with a microporous catalyst component that may be selected from molecular sieves having 8-MR pore access less than or equal to 5.1 Å and a cage defining ring size less than or equal to 7.45 Å. In embodiments, the microporous catalyst component may comprise a framework type selected from the ERI, LEV, DDR, HEU, PHI, STI, NAT or ATN framework types, and combinations thereof, the framework types corresponding to the naming convention of the International Zeolite Association. In embodiments, the microporous catalyst component may comprise one or more of silica-aluminate or silicoaluminophosphate. It should be understood that in embodiments, both aluminosilicate, silicaaluminate, and silicoaluminophosphate frameworks may be used. In one or more embodiments, the molecular sieve may be H-ERI having an Erionite (ERI) framework type.

According to embodiments, the microporous catalyst component may comprise a $SiO_2/Al_2O_3$ molar ratio less than or equal to 50.0, such as less than or equal to 48.0, less than or equal to 46.0, less than or equal to 44.0, less than or equal to 42.0, less than or equal to 40.0, less than or equal to 38.0, less than or equal to 36.0, less than or equal to 34.0, less than or equal to 32.0, less than or equal to 30.0, less than or equal to 28.0, less than or equal to 26.0, less than or equal to 24.0, less than or equal to 22.0, less than or equal to 20.0, less than or equal to 18.0, less than or equal to 16.0, less than or equal to 14.0, less than or equal to 12.0, or less than or equal to 10.0. In embodiments, the microporous catalyst component may comprise a $SiO_2/Al_2O_3$ molar ratio greater than or equal to 1.0, such as greater than or equal to 1.5, greater than or equal to 2.0, greater than or equal to 2.5, greater than or equal to 3.0, greater than or equal to 3.5, greater than or equal to 4.0, or greater than or equal to 4.5.

Examples of these may include, but are not necessarily limited to: ERI embodiments selected from SAPO-17 OR SSZ-98; and LEV embodiments such as SAPO-35 or SSZ-17. Other embodiments may include ERI-LEV intergrowths such as for instance SSZ-105. Combinations of microporous catalyst components having any of the above framework types may also be employed. It should be understood that the microporous catalyst component may have a different membered ring pore opening depending on the desired product. For instance, microporous catalyst component having 8-MR to 12-MR pore openings could be used depending on the desired product. However, to produce $C_2$ to $C_3$ hydrocarbons, a microporous catalyst component having 8-MR pore openings is used in embodiments.

Without being bound to any particular theory, it is believed that the pore access (Atlas of zeolite framework types, 6$^{th}$ edition, Elsevier, pg. 381-86, 2007) and cage defining ring size (ACS Catalysis, 2019, Vol. 9, pg. 6017) may contribute to a desired hydrocarbon product. The pore access may be important to narrow the product distribution. Additionally, the cage defining ring size may be important for enhancing the $C_2$ fraction in the product distribution. The cage defining ring size may be equivalent to the longest axis of an ellipsoid that may fit into the cage of the microporous catalyst component. In embodiments, where the microporous catalyst component does not comprise a cage, the pore access and the largest channel dimension of the microporous catalyst component may contribute to the desired hydrocarbon product. Together, the pore access and the cage defining ring size may be tailored to target a hydrocarbon product with a specific product distribution. This theory may be supported by "Cage-Defining Ring: A Molecular Sieve Structural Indicator for Light Olefin Product Distribution from the Methanol-to-Olefins Reaction," John Hun Kang, Faisal H. Alshafei, Stacey I. Zones, & Mark E. Davis, ACS Catalysis 2019 9(7), 6012-6019 (Apr. 11, 2019).

As previously described, in embodiments, the molecular sieves of the microporous catalyst component may have 8-MR pore access less than or equal to 5.1 Å. In embodiments, the molecular sieves of the microporous catalyst component may have 8-MR pore access greater than or equal to 1.0 Å, such as greater than or equal to 1.5 Å, greater than or equal to 2.0 Å, greater than or equal to 2.5 Å, greater than or equal to 3.0 Å, greater than or equal to 3.3 Å, greater than or equal to 3.6 Å, greater than or equal to 3.9 Å, greater than or equal to 4.2 Å, greater than or equal to 4.5 Å, or greater than or equal to 4.8 Å. Also, in embodiments, the molecular sieves of the microporous catalyst component may comprise a cage defining ring size less than or equal to 7.45 Å. In embodiments, the molecular sieves of the microporous catalyst component may comprise a cage defining ring size greater than or equal to 7.45 Å, such as greater than or equal to 3.00 Å, greater than or equal to 4.00 Å, greater than or equal to 5.00 Å, greater than or equal to 6.00 Å, greater than or equal to 6.25 Å, greater than or equal to 6.50 Å, greater than or equal to 6.75 Å, greater than or equal to 7.00 Å, greater than or equal to 7.25 Å

As further demonstrated in the examples below, the microporous catalyst component, prior to combination with the mixed metal oxide catalyst component, may be ion exchanged. Without being bound to any particular theory, the ion exchange may alter the properties of the microporous catalyst component (and therefore, the overall hybrid catalyst) by increasing the acidity of the microporous catalyst component by replacing metal atoms, such as, but not limited to, potassium or sodium, with hydrogen. As the acidity of the microporous catalyst component is increased, this may alter the chemistry of the hybrid catalyst to tailor the process to form a desirable product.

The mixed metal oxide catalyst component and the microporous catalyst component of the hybrid catalyst may be mixed together by any suitable means, such as, for example, by physical mixing-such as shaking, stirring, or other agitation. In embodiments, the mixed metal oxide catalyst component and the microporous catalyst component may be present as a single formulated catalyst. The mixed metal oxide catalyst component and the microporous catalyst component may be present in the reaction zone 101, typically as a hybrid catalyst in a catalyst bed, in a weight/weight (wt./wt.) ratio (mixed metal oxide catalyst component:microporous catalyst component) ranging from 0.1:1 to 10:1, such as from 0.5:1 to 9:1.

While the hybrid catalyst described herein may be applicable to processes other than synthesis gas to hydrocarbons type systems, it has been discovered that hybrid catalysts may not be directly transferable between various processes. That is, a catalyst may be an effective catalyst for one process, but may show poor performance in another process. For example, a catalyst demonstrating satisfactory performance in terms of $C_2/C_3$ carbon molar ratio in a methanol-to-olefins process may not be directly transferable to a synthesis gas to hydrocarbon process, where the same catalyst may not exhibit the same satisfactory performance. For example, a hybrid catalyst comprising SSZ-13 with CHA topology may not demonstrate the same product distributions in different systems, such as MTO, that it provides in synthesis gas to hydrocarbons type systems.

EXAMPLES

Embodiments will be further clarified by the following examples.

Example 1: Hybrid Catalyst with H-ERI Microporous Catalyst Component

In Example 1, a microporous catalyst component was prepared from Erionite. The Erionite, which was sourced from Minerals Research, P.O. Box 591, Clarkson, N.Y. 14430, was collected from Eastgate, Nevada. Roughly 10 g of Erionite 25220 was placed in a flint glass jar with a stir bar. Then, 100 mL of 0.1 M ammonium acetate was added. A series of three ion exchanges were performed. After each ion exchange, the solids were recovered by filtration, rinsed, and then re-suspended. In the first exchange, the Erionite and ammonium acetate were stirred at ambient temperature for eighteen hours. In the second exchange (after filtration, rinse, and re-suspension), the Erionite and ammonium acetate were stirred at ambient temperature for five hours. In the third exchange (after filtration, rinse, and re-suspension), the Erionite and ammonium acetate were again stirred at ambient temperature for eighteen hours. After the third and final exchange, the final products were collected by filtration, rinsed, and then dried at 90° C. Following drying, the product was calcined in air, by ramping the temperature up to 550° C. at 2.5° C. per minute. The temperature was then held at 550° C. for four hours. The calcined powder was then compacted and sized to 60-100 mesh size to form the H-ERI microporous catalyst component.

To prepare the mixed metal oxide catalyst component, an impregnation solution of 4.40 mL of gallium stock solution (gallium (III) nitrate hydrate with C=2.0 M in deionized water), 1.76 mL of lanthanum stock solution (lanthanum (III) nitrate hexahydrate with C=1.5M in deionized water), and 2.86 mL of deionized water was mixed. Then, 20 g of 60-80 mesh size $ZrO_2$ support (NORPRO© SZ31164) with a Brunauer-Emmett-Teller of 100 $m^2/g$, a pore volume of 0.41 mL/g (measured by deionized water), and a 100% monoclinic phase (measured by XRD) was placed in a glass vial. The impregnation solution was then added dropwise to the $ZrO_2$ support while shaking. Once the impregnation solution had been combined with the $ZrO_2$ support, the mixture was dried at 120° C. in static air. Then, the product was calcined by ramping the temperature to up to 120° C. at 2.0° C. per minute. After the temperature was held at 120° C. for two hours, the temperature was again ramped up, this time to 550° C. at 3.0° C. per minute. After the temperature was held at 550° C. for four hours, the product was cooled down to room temperature over a period of two hours. After calcination the catalyst was re-sieved to 60-100 mesh size to remove any fine particles. As determined by X-ray fluorescence, the mixed metal oxide catalyst component had a composition of 3.1 wt. % Ga, 1.5 wt. % La, 67.3 wt. % Zr, 2.4 wt. % Hf, and 25.7 wt. % 0.

To prepare the hybrid catalyst, the microporous catalyst component and the mixed metal oxide were mixed and shaken for thirty seconds.

Example 2: Hybrid Catalyst with LZ-220 Microporous Catalyst Component

To prepare the microporous catalyst component, the H-ERI microporous catalyst component of Example 1 was further treated to produce the LZ-220 microporous catalyst component. LZ-220 is further described in U.S. Pat. No. 4,503,023, which is incorporated by reference herein. First, an ammonium hexafluorosilicate stock solution was prepared by dissolving 8.0 g $(NH_4)_2SiF_6$ in 250 mL of high purity water. Then 5.0 g of ion-exchanged $NH_4$-ERI (that is, the microporous catalyst component of Example 1) was suspended in 100 mL of high purity water in a flint glass jar with a stir bar, which was immersed in a water bath while stirring vigorously. While the $NH_4$-ERI solution was heated to 80° C., 50 mL of the ammonium hexafluorosilicate solution was added to the $NH_4$-ERI solution. Then, the resulting mixture was heated to 90° C. and held at 90° C. for three hours. After the solution was cooled for one hour, solids were collected by filtration and rinsed. The final solids were then dried at 90° C. Then, the as-prepared microporous catalyst component was dried and calcined in air by ramping the temperature up to 550° C. at 2.5° C. per minute. The temperature was then held at 550° C. for four hours. The calcined powder was then compacted and sized to 60-100 mesh size to form the LZ-220 microporous catalyst component.

The mixed metal oxide catalyst component was prepared in the same manner as Example 1. Finally, the microporous catalyst component and the mixed metal oxide were mixed and shaken for thirty seconds to form the hybrid catalyst.

Comparative Example 1: Hybrid Catalyst with SAPO-34 Microporous Catalyst Component To prepare the SAPO-34 microporous catalyst component, the microporous catalyst component was synthesized according to the procedure of U.S. Pat. No. 4,440,871 Å, which is incorporated by reference herein, was used. The as-formed microporous catalyst component was then calcined in air by ramping the temperature from 25° C. to 600° C. at 5° C. per minute. The temperature was kept at 600° C. for four hours before the temperature was reduced to 25° C. over a period of four hours. The calcined powder was then compacted and sized to 60-100 mesh size to form the SAPO-34 microporous catalyst component.

In Comparative Example 1, the mixed metal oxide catalyst component and the preparation of the hybrid catalyst are the same as Example 1 and 2.

Comparative Example 2: Hybrid Catalyst with SSZ-39 Microporous Catalyst Component The SSZ-39 sample was a readily available commercial product (available from China Catalyst Holding Co., Ltd.). The structure and crystallinity of the SSZ-39 microporous catalyst component were confirmed by XRD. The sample was calcined in air suing the same procedure as Comparative Example 1 and then sized to 60-100 mesh size to form the SSZ-39 microporous catalyst component.

In Comparative Example 2, the mixed metal oxide catalyst component and the preparation of the hybrid catalyst are the same as Example 1 and 2.

Comparative Example 3: Hybrid Catalyst with SAPO-11 Microporous Catalyst Component The SAPO-11 sample was a readily available commercial product (available from China Catalyst Holding Co., Ltd.). The structure and crystallinity of the SAPO-11 microporous catalyst component were confirmed by XRD. The sample was calcined in air suing the same procedure as Comparative Example 1 and then sized to 60-100 mesh size to form the SAPO-11 microporous catalyst component.

In Comparative Example 3, the mixed metal oxide catalyst component and the preparation of the hybrid catalyst are the same as Example 1 and 2.

Comparative Example 4: Hybrid Catalyst with ZSM-5 Microporous Catalyst Component The ZSM-5 sample was a readily available commercial product (available from China Catalyst Holding Co., Ltd.). The structure and crystallinity of the ZSM-5 microporous catalyst component were confirmed by XRD. The sample was calcined in air suing the same procedure as Comparative Example 1 and then sized to 60-100 mesh size to form the ZSM-5 microporous catalyst component.

In Comparative Example 3, the mixed metal oxide catalyst component and the preparation of the hybrid catalyst are the same as Example 1 and 2.

Compositions of Microporous Catalyst Components of Examples 1-2 and Comparative Examples 1-4

The compositions of the microporous catalyst components of Examples 1-2 and Comparative Examples 1-4 are shown in Table 1.

TABLE 1

Compositions of Examples 1-2 and Comparative Examples 1-4

| | Na wt. % Percent | Mg wt. % Percent | Al wt. % Percent | Si wt. % Percent | S wt. % Percent | P wt. % Percent | K wt. % Percent | Ca wt. % Percent | Ti wt. % Percent | Fe wt. % Percent | Zr wt. % Percent | $SiO_2/Al_2O_3$ (mol/mol) |
|---|---|---|---|---|---|---|---|---|---|---|---|---|
| ERI | 7.0 | 0.3 | 8.5 | 29.6 | 0.9 | 0.0 | 0.3 | 3.9 | 0.3 | 1.8 | | 6.8 |
| H-ERI (Ex. 1) | 0.3 | 0.2 | 9.4 | 34.1 | 0.3 | 0.0 | 0.0 | 4.3 | 0.1 | 1.5 | | 7.0 |
| LZ-220 (Ex. 2) | 0.2 | 0.2 | 8.4 | 35.3 | 0.3 | 0.0 | 0.0 | 3.7 | 0.1 | 1.5 | | 8.1 |
| SAPO-34 (Comp. Ex. 1) | | | 22.3 | 4.35 | | 21.14 | | | | | | — |
| SSZ-39 (Comp. Ex. 2) | | | 4.6 | 42.6 | | | | | | 0.0352 | | 17.8 |
| SAPO-11 (Comp. Ex. 3) | | | 21.7 | 6.24 | | 19.8 | | | | 0.0216 | 0.14 | 0.55 |
| ZSM-5 (Comp. Ex. 4) | | | 3.7 | 43.44 | | | | | | 0.0313 | 0.0225 | 23 |

Further, the structural properties of Examples 1-2 and Comparative Examples 1-4 are shown in Table 2.

TABLE 2

Structural Properties of Examples 1-2 and Comparative Examples 1-4

| | Topology | Pore Structure | Pore Diameter (Å) | Cage Defining Ring Size (Å) |
|---|---|---|---|---|
| ERI | ERI | 8-MR | 5.1 × 3.6 | 6.76 |
| H-ERI (Ex. 1) | ERI | 8-MR | 5.1 × 3.6 | 6.76 |
| LZ-220 (Ex. 2) | ERI | 8-MR | 5.1 × 3.6 | 6.76 |
| SAPO-34 (Comp. Ex. 1) | CHA | 8-MR | 3.1 × 3.6 | 7.45 |
| SSZ-39 (Comp. Ex. 2) | AEI | 8-MR | 3.8 × 3.8 | 8.52 |
| SAPO-11 (Comp. Ex. 3) | AEI | 10-MR | 6.5 × 4.0 | Not Determined |
| ZSM-5 (Comp. Ex. 4) | MFI | 10-MR | 5.1 × 5.5; 5.3 × 5.6 | Not Determined |

Catalytic Test of Example 1-2 and Comparative Examples 1-4

Catalytic tests were performed in a tubular stainless steel reactor with an inner diameter of 3 mm or a quartz fixed-bed reactor with an inner diameter of 2 mm. The bottom of the stainless steel reactor features a metal frit to hold the catalyst bed. The bottom of the quartz reactor is filled with quartz chips with wool on top to hold the catalyst bed. In a catalytic test, the hybrid catalyst is loaded to the catalyst and the following procedure is followed: nitrogen is flowed to the reactor as the temperature is raised from 25° C. to the reaction temperature, increasing at 5° C. per minute. Similarly, the pressure is increased from ambient conditions to the reaction pressure. Then, the nitrogen flow is replaced with a flow of synthesis gas. The synthesis gas flow is continued for one hour for flushing prior to the gas chromatography analysis beginning. After a set run time duration, the syngas flow is replaced with nitrogen flow as the reactor returns from reaction temperature and pressure to ambient temperature and pressure.

Two different reaction conditions were utilized in the catalytic test of Examples 1-2 and Comparative Examples 1-4, which are shown in Table 3.

TABLE 3

Reaction Conditions

| | Mixed Metal Oxide Component (mg) | Microporous Catalyst Component (mg) | $H_2$ (vol. %) | CO (vol. %) | He (vol. %) | GHSV ($h^{-1}$) | T (° C.) | P (bara) | Time on Stream (h) |
|---|---|---|---|---|---|---|---|---|---|
| Condition 1 | 100.0 | 50.0 | 67.5 | 22.5 | 10 | 3600 | 420 | 40 | 30-60 |
| Condition 2 | 112.5 | 37.5 | 67.5 | 22.5 | 10 | 3840 | 420 | 40 | 30-60 |

Finally, the catalytic data for various catalytic tests of Examples 1-2 and Comparative Examples 1-4 is shown in Table 4. Additionally, the selectivity of the products is further detailed in Table 5. Products were analyzed using gas chromatography. Online analysis of components ($N_2$, $H_2$, He, CO, $CO_2$, $C_1$-$C_5$ alkanes, $C_2$-$C_5$ olefins, methanol, and dimethyl ether) was performed periodically to monitor reaction progress. In all experiments, mass balance was 100±5% based on carbon.

TABLE 4

Catalytic Data of Examples 1-2 and Comparative Examples 1-4

| | Condition | Conversion (C mol. %) | Carbon Balance (C mol. %) | $C_2/C_3$ Carbon Molar Ratio |
|---|---|---|---|---|
| Example 1 | 1 | 47.5 | 98.1 | 1.1 |
| Example 1 | 2 | 41.9 | 99.1 | 1.3 |
| Example 2 | 1 | 42.6 | 97.8 | 1.2 |
| Example 2 | 2 | 42.3 | 98.0 | 1.4 |
| Comparative Example 1 | 1 | 58.1 | 97.9 | 0.3 |
| Comparative Example 1 | 2 | 58.6 | 97.7 | 0.3 |
| Comparative Example 2 | 1 | 56.2 | 96.1 | 0.2 |
| Comparative Example 2 | 2 | 55.4 | 95.8 | 0.2 |
| Comparative Example 3 | 1 | 35.7 | 87.7 | 0.6 |
| Comparative Example 4 | 1 | 56.8 | 86.2 | 0.3 |

TABLE 5

Selectivity of Examples 1-2 and Comparative Examples 1-4

| | Methane (C mol %) | Ethylene (C mol %) | Propylene (C mol %) | Ethane (C mol %) | Propane (C mol %) | Oxygenates* (C mol %) | $CO_2$ (C mol %) |
|---|---|---|---|---|---|---|---|
| Example 1 | 5.1 | 13.4 | 10.0 | 12.8 | 14.2 | 0.5 | 38.0 |
| Example 1 | 5.7 | 13.5 | 9.0 | 13.7 | 13.0 | 0.9 | 40.1 |
| Example 2 | 5.3 | 15.4 | 11.3 | 10.7 | 11.1 | 0.6 | 38.3 |
| Example 2 | 6.1 | 15.8 | 11.0 | 11.5 | 8.6 | 0.7 | 39.3 |
| Comparative Example 1 | 0.9 | 8.5 | 31.2 | 2.8 | 10.4 | 0.1 | 34.4 |
| Comparative Example 1 | 0.9 | 9.6 | 31.2 | 2.4 | 8.6 | 0.2 | 35.0 |
| Comparative Example 2 | 1.4 | 4.3 | 13.3 | 2.1 | 26.4 | 0.2 | 35.8 |
| Comparative Example 2 | 1.2 | 4.9 | 15.6 | 1.7 | 21.5 | 0.3 | 36.9 |
| Comparative Example 3 | 1.1 | 3.6 | 6.1 | 1.0 | 1.9 | 1.2 | 40.3 |
| Comparative Example 4 | 2.1 | 0.9 | 0.0 | 2.6 | 13.7 | 0.1 | 35.1 |

| | $C_4$ Olefins (C mol %) | $C_5$ Olefins (C mol %) | $C_4$ Paraffins (C mol %) | $C_5$ Paraffins (C mol %) |
|---|---|---|---|---|
| Example 1 | 1.7 | 0.0 | 0.6 | 0.0 |
| Example 1 | 2.1 | 0.0 | 0.6 | 0.0 |
| Example 2 | 2.2 | 0.0 | 0.6 | 0.0 |
| Example 2 | 2.1 | 0.0 | 0.5 | 0.0 |
| Comparative Example 1 | 6.8 | 0.1 | 1.5 | 0.1 |
| Comparative Example 1 | 7.0 | 0.1 | 1.4 | 0.1 |
| Comparative Example 2 | 6.7 | 0.0 | 3.0 | 0.3 |
| Comparative Example 2 | 8.0 | 0.0 | 2.3 | 0.2 |
| Comparative Example 3 | 3.7 | 3.7 | 3.4 | 0.0 |
| Comparative Example 4 | 0.5 | 0.0 | 21.1 | 0.0 |

As can be seen from Table 4 and 5, hybrid catalysts comprising a microporous catalyst component comprising 8-MR pore openings less than or equal to 5.1 Å and a cage defining ring size less than or equal to 7.45 Å (Examples 1 and 2) may be capable of converting synthesis gas to hydrocarbons with a high $C_2$ and $C_3$ selectivity (such as, greater than 40 C mol % based on the total hydrocarbon fraction in the product stream) with a $C_2/C_3$ carbon molar ratio greater than 1.0. Conversely, hybrid catalysts not comprising a microporous catalyst component comprising 8-MR pore openings less than or equal to 5.1 Å and a cage defining ring size less than or equal to 7.45 Å (Comparative Examples 1-4) may not be capable of converting synthesis gas to hydrocarbons with a high $C_2$ and $C_3$ selectivity (such as, greater than 40 C mol % based on the total hydrocarbon fraction in the product stream) with a $C_2/C_3$ carbon molar ratio greater than 1.0.

Calculations for Catalyst Performance for Examples and Comparative Examples

Carbon monoxide conversion ($X_{CO}$ [C mol %]) is defined as the ratio between molar carbon monoxide flow leaving the reaction zone to carbon monoxide flow entering the reaction zone. The formula for calculating the carbon monoxide conversion is shown below in Equation 1:

$$X_{CO} = \frac{F_{CO,in} - F_{CO,out}}{F_{CO,in}} * 100 \quad \text{(Equation 1)}$$

where $F_{CO,in}$ is a molar flow of carbon monoxide entering the reaction zone, measured in mol/h, and $F_{CO,out}$ is a molar flow of carbon monoxide leaving the reaction zone, measured in mol/h.

The selectivity [C mol %] of i component is measured as an average of all data points for a time-on-stream specified in Tables 3 and 4. The formula for calculating selectivity of i component is shown below in Equation 2:

$$S_i = \frac{n_i * F_i}{F_{CO,in} - F_{CO,out}} * 100 \quad \text{(Equation 2)}$$

where $n_i$ is a number of carbon atoms in i component, $F_i$ is a molar flow of i component leaving the reaction zone, measured in mol/h, $F_{CO,in}$ is a molar flow of carbon monoxide entering the reaction zone, measured in mol/h, and $F_{CO,out}$ is a molar flow of carbon monoxide leaving the reaction zone, measured in mol/h.

Carbon balance (CB) [C mol %] is the ratio between the total amount of carbon entering the reaction zone in the form of carbon monoxide and carbon leaving the reaction zone in the form of carbon monoxide and carbon-containing products. The formula for the carbon balance is shown below in Equation 3:

$$CB = \frac{\Sigma n_i * F_i}{F_{CO,in}} * 100 \quad \text{(Equation 3)}$$

where $n_i$ is a number of carbon atoms in i component, $F_i$ is a molar flow of i component leaving the reaction zone, measured in mol/h, and $F_{CO,in}$ is a molar flow of carbon monoxide entering the reaction zone, measured in mol/h.

$C_2/C_3$ ratio was calculated using Equation 4, shown below:

$$C_2/C_3 \text{ ratio} = \frac{2*(F_{ethylene} + F_{ethane})}{3*(F_{propylene} + F_{propane})} * 100 \quad \text{(Equation 4)}$$

where $F_{propylene}$ and $F_{propane}$ are the molar flows of propylene and propane, respectively, measured in mol/h, and $F_{ethylene}$ and $F_{ethane}$ are the molar flows of ethylene and ethane, respectively, measured in mol/h.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. A process for preparing $C_2$ to $C_3$ hydrocarbons comprising:
introducing a feed stream comprising hydrogen gas and a carbon-containing gas selected from the group consisting of carbon monoxide, carbon dioxide, and mixtures thereof into a reaction zone of a reactor; and
converting the feed stream into a product stream comprising $C_2$ to $C_3$ hydrocarbons in the reaction zone in the presence of a hybrid catalyst, the hybrid catalyst comprising:
a mixed metal oxide catalyst component; and
a microporous catalyst component comprising 8-MR pore openings having a size less than or equal to 5.1 Å and a cage defining ring size less than or equal to 7.45 Å, wherein:
a $C_2/C_3$ carbon molar ratio of the product stream is greater than or equal to 0.7.

2. The process of claim 1, wherein the microporous catalyst component comprises one or more of silicaaluminate or silicoaluminophosphate (SAPO).

3. The process of claim 1, wherein the microporous catalyst component comprises an Erionite or Levyne structure.

4. The process of claim 1, wherein the microporous catalyst component comprises one or more of SAPO-17, SAPO-35, LZ-220, SSZ-17, SSZ-98, SSZ-105, SAPO-67, or combinations thereof.

5. The process of claim 1, wherein the microporous catalyst component comprises a $SiO_2/Al_2O_3$ molar ratio less than or equal to 50.0.

6. The process of claim 1, wherein the metal component comprises from 0.1 wt. % to 10.0 wt. % of the metal oxide catalyst component.

7. The process of claim 1, wherein the mixed metal oxide catalyst component comprises a metal oxide support material comprising zirconia.

8. The process of claim 7, wherein the mixed metal oxide catalyst component comprises gallium supported on zirconia.

9. The process of claim 1, wherein the reaction zone operates at a temperature from 370° C. to 470° C.

10. The process of claim 1, wherein the reaction zone operates at a pressure from 20 bar to 70 bar.

11. The process of claim 1, wherein the gas hourly space velocity (GHSV) is greater than 500 $hr^{-1}$.

12. The process of claim 1, wherein the hybrid catalyst comprises a metal oxide catalyst component to microporous catalyst component weight ratio of from 0.1:1 to 10:1.

13. The process of claim 1, wherein the product stream comprises greater than 40 C mol % $C_2$ to $C_3$ hydrocarbons based on the total hydrocarbon fraction in the product stream.

14. The process of claim 1, wherein the $C_2/C_3$ carbon molar ratio of the product stream is greater than or equal to 1.0.

15. The process of claim 1, wherein the $C_2$ to $C_3$ hydrocarbons consist essentially of olefins.

* * * * *